(12) United States Patent
Poree et al.

(10) Patent No.: US 9,911,195 B2
(45) Date of Patent: Mar. 6, 2018

(54) METHOD OF SAMPLING COLORS OF IMAGES OF A VIDEO SEQUENCE, AND APPLICATION TO COLOR CLUSTERING

(71) Applicant: THOMSON LICENSING, Issy de Moulineaux (FR)

(72) Inventors: Corinne Poree, Rennes (FR); Jonathan Kervec, Paimpont (FR); Emmanuel Jolly, Rennes (FR)

(73) Assignee: THOMSON LICENSING, Issy-Les-Moulineaux (FR)

( * ) Notice: Subject to any disclaimer, the term of this patent is extended or adjusted under 35 U.S.C. 154(b) by 0 days.

(21) Appl. No.: 14/421,819

(22) PCT Filed: Aug. 7, 2013

(86) PCT No.: PCT/EP2013/066565
§ 371 (c)(1),
(2) Date: Feb. 14, 2015

(87) PCT Pub. No.: WO2014/026895
PCT Pub. Date: Feb. 20, 2014

(65) Prior Publication Data
US 2015/0248767 A1 Sep. 3, 2015

(30) Foreign Application Priority Data
Aug. 14, 2012 (EP) ..................... 12306003

(51) Int. Cl.
*G06T 7/11* (2017.01)
*H04N 1/64* (2006.01)
(Continued)

(52) U.S. Cl.
CPC ............... *G06T 7/11* (2017.01); *G06T 7/136* (2017.01); *G06T 7/174* (2017.01); *G06T 7/215* (2017.01);
(Continued)

(58) Field of Classification Search
None
See application file for complete search history.

(56) References Cited

U.S. PATENT DOCUMENTS

| 5,796,864 A | 8/1998 | Callahan |
| 6,526,169 B1 | 2/2003 | Murching et al. |

(Continued)

FOREIGN PATENT DOCUMENTS

| CN | 101506840 | 8/2009 |
| CN | 101533515 | 9/2009 |

(Continued)

OTHER PUBLICATIONS

WIPO Search Report and Written Opinion dated Feb. 17, 2015.*
(Continued)

*Primary Examiner* — Kim Vu
*Assistant Examiner* — Nathan Bloom
(74) *Attorney, Agent, or Firm* — Tutunjian & Bitetto, P.C.

(57) ABSTRACT

The method comprises the steps of, successively for each image following a preceding image
 based on a map of motion vectors that corresponds to the motion from said preceding image toward said following image, building a pixel mask for said following image,
 applying said pixel mask to the corresponding following image in order to obtain a corresponding masked image that samples the pixels of said following image.

The application of this method to color clustering allows the iterative update of the colors clusters with limited computer resources.

4 Claims, 5 Drawing Sheets

(51) Int. Cl.
*G06T 7/254* (2017.01)
*G06T 7/136* (2017.01)
*G06T 7/215* (2017.01)
*G06T 7/174* (2017.01)
*H04N 19/553* (2014.01)

(52) U.S. Cl.
CPC ............ *G06T 7/254* (2017.01); *H04N 1/644* (2013.01); *H04N 19/553* (2014.11); *G06T 2207/10016* (2013.01); *G06T 2207/10024* (2013.01); *G06T 2207/20224* (2013.01)

(56) References Cited

U.S. PATENT DOCUMENTS

| | | | |
|---|---|---|---|
| 6,785,329 | B1 | 8/2004 | Pan et al. |
| 7,760,935 | B2 | 7/2010 | Kim |
| 7,804,980 | B2 | 9/2010 | Sasaki |
| 2007/0005795 | A1* | 1/2007 | Gonzalez .......... G06F 17/30017 709/232 |
| 2007/0110303 | A1* | 5/2007 | Bhattacharjya ...... G09G 3/2003 382/166 |
| 2008/0298688 | A1 | 12/2008 | Cheong et al. |
| 2010/0265404 | A1 | 10/2010 | McCarthy et al. |
| 2011/0044537 | A1* | 2/2011 | Cobb ................ G06K 9/00771 382/165 |
| 2011/0254950 | A1* | 10/2011 | Bibby ...................... G06T 7/11 348/135 |
| 2012/0133789 | A1* | 5/2012 | Wu ...................... G06K 9/4652 348/222.1 |

FOREIGN PATENT DOCUMENTS

| | | |
|---|---|---|
| CN | 101931792 | 12/2010 |
| JP | 6350974 | 12/1994 |
| JP | 7212760 | 8/1995 |
| JP | 2003513538 | 4/2003 |
| WO | 01/31497 | 5/2001 |
| WO | WO0131497 | 5/2001 |
| WO | WO2004013810 | 2/2004 |

OTHER PUBLICATIONS

Guo et al: "Fast video object segmentation using affine motion and gradient-based color clustering",Multimedia Signal Processing, 1998 IEEE Second Workshop on Redondo Beach, CA, USADec. 7-9, 1998, IEEE, Dec. 7, 1998 (Dec. 7, 1998), pp. 486-491.
Piek et al: "Unsupervised Motion-Based Object Segmentation Refined by Colour", Proc. of the SPIE, vol. 5150, Jul. 8, 2003 (Jul. 8, 2003),pp. 346-357.
Jain et al: Data Clustering: A Review Journal; ACM Computing Surveys (CSUR) Surveys; vol. 31; Issue 3, Sep. 1999 pp. 264-323.
Search Report dated Feb. 18, 2014.

* cited by examiner

METHOD OF SAMPLING COLORS OF IMAGES OF A VIDEO SEQUENCE, AND APPLICATION TO COLOR CLUSTERING

This application claims the benefit, under 35 U.S.C. § 365 of International Application PCT/EP2013/066565, filed Aug. 7, 2013, which was published in accordance with PCT Article 21(2) on Feb. 20, 2014 in English and which claims the benefit of European patent application No. 12306003.0, filed Aug. 14, 2012.

TECHNICAL FIELD

The invention relates to the clustering of colors of images of a video sequence, and notably to a specific previous sampling of colors.

BACKGROUND ART

The clustering of colors requires high computing resources. In order to lower the requirement of computing resources, colors are generally sampled before being clustered. The aim of such sampling is to reduce the number of pixels in each image that have to be considered for the clustering. The pixels of images may be sampled for instance by a factor of 100. It means that only the sampled pixels are used for clustering the colors: for instance, $\frac{1}{100}$ of the pixels of each image are considered. The sampling is preferably performed without any filtering process in order not to introduce artificial colors, and, as a matter of fact, colors that are not sampled are taken into account for the subsequent color clustering. For this reason, subsampling ratio should be carefully determined to strike a fair balance between computational complexity and accuracy. As an example of such a sampling, if the images of a video content are formatted as 1920×1080 HDTV, i.e. with about 2 million pixels each, each image can be sampled by a factor 100 to get 100 subimages at the format 192×108, i.e. about 20,000 pixels each. For each line among 10 lines, we take one pixel among 10 pixels.

For the clustering itself of sampled or not sampled colors, a key element is the organization of these colors into meaningful clusters based on similarity. In the article entitled "Data clustering: A review", published in September 1999 in ACM Computing Surveys, 31(3), pp. 264-323, a wide spectrum of techniques for cluster formation is proposed. According to this review, there are two types of clustering algorithms, i.e. hierarchical and partitional algorithms. Partitional clustering algorithms have advantages over hierarchical methods in applications involving large data sets. The partitional techniques usually produce clusters by optimizing a criterion function. The most intuitive and frequently used criterion function in partitional clustering techniques is the squared error criterion. The k-means is the simplest and most commonly used algorithm employing a squared error criterion. It starts with a random initial partition and keeps reassigning the patterns to clusters based on the similarity between the pattern and the cluster centres until a convergence criterion is met. The k-means algorithm is popular because it is easy to implement, and its time complexity is O(n), where n is the number of patterns.

In the article entitled "Fast Video Object Segmentation Using Affine Motion And Gradient-Based Color Clustering" published at pages 486-91 in 1998 in the IEEE Second Workshop on Multimedia Signal Processing (Cat. No. 98EX175), the authors Ju Guo Jongwon Kim Kuo et al. disclose a non-parametric gradient-based iterative color clustering algorithm called the mean shift algorithm, that provides a robust initial dominant color regions according to color similarity. According to this color clustering method in which the dominant color information obtained from previous frames is used as an initial seed for the next frame, the amount of computational time can be reduced by 50%.

SUMMARY OF INVENTION

An object of the invention is to further reduce the computational time that is necessary for the color clustering of video sequences.

For this purpose, the subject of the invention is a method of building a pixel mask for an image following a preceding image in a video sequence, comprising the steps of:
building a map of motion vectors that corresponds to the motion from said preceding image toward said following image,
by applying said map of motion vectors to said preceding image, generating a compensated image that motion compensates said preceding image in reference to said following image,
building a pixel mask for said following image from the difference, pixel by pixel, between said compensated image and said preceding image.

As a variant, the subject of the invention is also a method of building a pixel mask for an image following a preceding image in a video sequence, comprising the steps of:
building a map of motion vectors that corresponds to the motion from said preceding image toward said following image:
based on the difference between the motion vector corresponding to each pixel of said preceding image and the motion vectors corresponding to neighbor pixels located in the neighborhood of said pixel, building a pixel mask for said following image.

Preferably, the methods above comprises also the step of comparing, for each pixel, said difference to a predetermined threshold, and assigning a "zero" value to the corresponding pixel of said pixel mask as soon as said difference is below said predetermined threshold or a "one" value to the corresponding pixel of said pixel mask as soon as said difference is equal or above said predetermined threshold.

The subject of the invention is also a method of sampling colors of images of a video sequence into colors of corresponding masked images, comprising the steps of, successively for each image following a preceding image of this sequence,
building a pixel mask for said following image according to a method as described above,
applying said pixel mask to the corresponding following image in order to obtain a corresponding masked image that samples the pixels of said following image.

More precisely, when the pixel mask is built and if it is applied to the following image, a masked image is formed that corresponds to a selection of pixels in this following image.

The subject of the invention is also a method of sampling colors of images of a video sequence into colors of corresponding masked images, comprising the steps of, successively for each image following a preceding image of this sequence,
building a pixel mask for said following image such that, when said pixel mask is applied to said following image, a masked image is formed that corresponds to a selection of pixels in said following image, applying said pixel mask to the corresponding following image in order to obtain a corresponding masked image that samples the pixels of said following image, wherein said building of a pixel mask for a given following image is based on a map of motion vectors that corresponds to the motion from said preceding image toward said following image.

Preferably, the images of the video sequence are successive images.

According to a first variant, for each following image of said video sequence having its preceding image, the building of a pixel mask is performed according to the following steps:

by applying said map of motion vectors to said preceding image, generating a compensated image that motion compensates said preceding image in reference to said following image, calculating, pixel by pixel, the difference between said compensated image and said preceding image, in order to get a difference image, comparing each pixel of said difference image to a predetermined threshold, and assigning a "zero" value to the corresponding pixel of the pixel mask as soon as said pixel of said difference image is below a predetermined threshold or a "one" value to the corresponding pixel of the pixel mask as soon as said pixel of said difference image is equal or above said predetermined threshold.

According to a second variant, for each following image of said video sequence having its preceding image, the building of a pixel mask is performed according to the following step:

for each pixel of said preceding image, comparing the motion vector corresponding to said pixel in said map of motion vectors with the motion vectors corresponding to neighbor pixels located in the neighborhood of said pixel, and assigning a "zero" value to the corresponding pixel of the pixel mask as soon as the difference between the motion vector corresponding to said pixel and the motion vectors corresponding to neighbor pixels is below a predetermined threshold or a "one" value to the corresponding pixel of the pixel mask as soon as said difference is equal or above said predetermined threshold.

An object of the invention is also a method of clustering colors of images of a video sequence wherein, before being clustered, the colors to cluster are sampled according to a method of sampling as described above, except for the image of said video sequence having no preceding image, i.e. except for the first image of said video sequence.

Preferably, the method of clustering colors comprises a first step of clustering the colors of the first image of the video sequence in order to generate a set of color clusters and to distribute said colors in color clusters of said generated set, and, each time a masked image is obtained, a step of clustering the colors already clustered together with the colors of said masked image in order to update the set of color clusters and to distribute said colors in color clusters of said updated set.

Advantageously, with such a method, color clustering is performed iteratively, then optimizing the use of computing resources.

As a variant, each time a masked image is obtained, the set of color clusters is updated only with the colors of the masked image and these colors are then distributed in the color clusters of this updated set. The clustering of colors of all images of the video sequence is therefore iteratively built through an advantageous saving of the computational resources.

The subject of the invention is also a pixel mask builder for building a pixel mask for an image following a preceding image in a video sequence, comprising:

a motion vector map builder configured to build a map of motion vectors that correspond to the motion from said preceding image toward said following image, an image generator configured to generate a compensated image that motion compensates said preceding image in reference to said following image by applying the map of motion vectors built by said motion vector map builder, wherein said pixel mask builder is configured to build a pixel mask for said following image from the difference, pixel by pixel, between said compensated image and said preceding image.

As a second variant, the subject of the invention is also a pixel map builder for building a pixel mask for an image following a preceding image in a video sequence, comprising a motion vector map builder configured to build a map of motion vectors that correspond to the motion from said preceding image toward said following image, and configured to build a pixel mask for said following image from the difference between the motion vector corresponding to each pixel of said preceding image and the motion vectors corresponding to neighbor pixels located in the neighborhood of said pixel.

The subject of the invention is also a color sampler for sampling colors of images of a video sequence into colors of corresponding masked images, comprising:

a pixel map builder according to the invention, for building a pixel mask, successively for each image following a preceding image of this sequence, a masked image builder configured to apply a pixel mask build by said pixel map builder to said following image, in order to obtain a corresponding masked image that samples the pixels of said following image.

The subject of the invention is also a color clustering device for clustering colors of images of a video sequence comprising:

a color sampler according to the invention, for sampling colors of images of a video sequence into colors of corresponding masked images, a color cluster generator configured to generate a set of colors clusters from the masked images provided by the color sampler;

a color distributor configured to distribute the colors of the masked images into the color clusters generated by the color cluster generator.

BRIEF DESCRIPTION OF DRAWINGS

The invention will be more clearly understood on reading the description which follows, given by way of non-limiting example and with reference to the appended figures in which.

DESCRIPTION OF EMBODIMENTS

The invention will now be described in the specific but non limiting context of color clustering the colors of the images of a video sequence.

Figure 7:
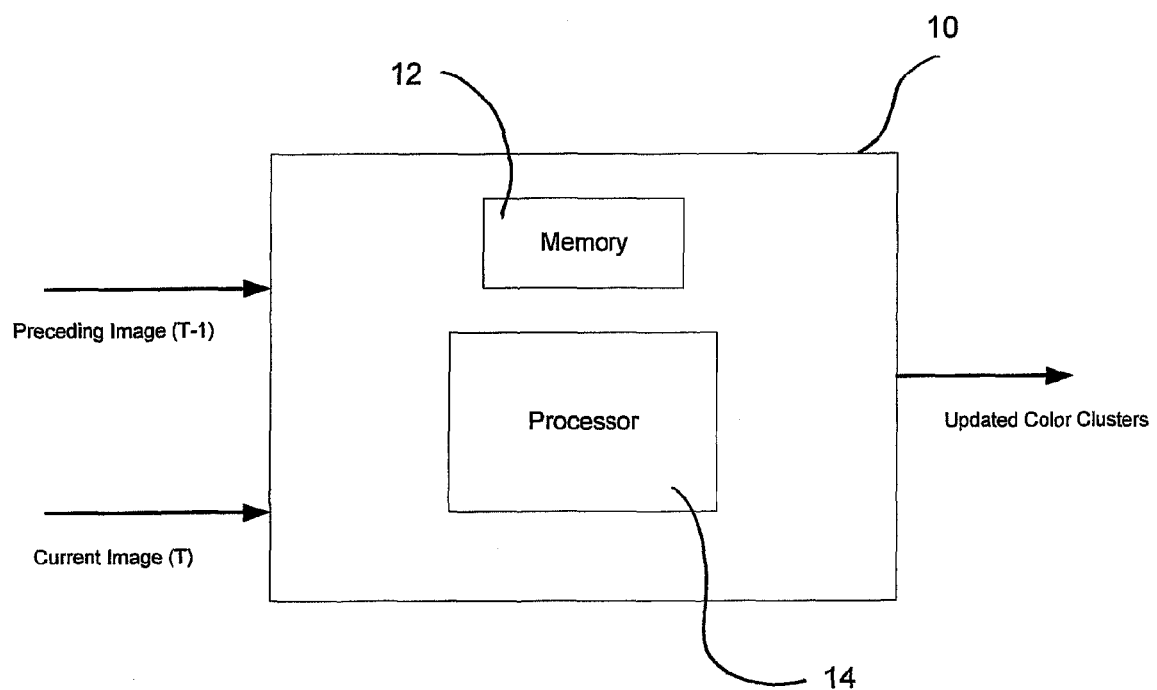
FIG. 7 is a block diagram of a basic computer processing system capable of implementing the method of the invention.

It will be appreciated by those skilled in the art that flow charts presented herein represent conceptual views of illustrative circuitry embodying the invention. They may be substantially represented in computer readable media and so executed by a computer or processor, whether or not such computer or processor is explicitly shown. FIG. 7 shows an example of such a computing system 10 having at least one processor 14 with an associated memory 12.

The functions of the various elements shown in the figures may be provided through the use of dedicated hardware as well as hardware capable of executing software in association with appropriate software.

Any switches or other similar elements shown in the figures are conceptual only. Their function may be carried out through the operation of program logic, through dedicated logic, through the interaction of program control and dedicated logic, the particular technique being selectable by the implementer as more specifically understood from the context.

Clustering the colors of images of a video sequence is performed according to the followings steps:

Step 1: the colors of the first image of the video sequence are clustered according to any predetermined method (see clustering examples above). Prior to this clustering, a sampling of these colors is preferably performed according to any predetermined method (see sampling examples above). The pixels of the first image may be sampled for instance by a factor of 100, by selecting one pixel over 100 in this image, such that the selected pixels are geometrically uniformly distributed in this images. The result of this step is the generation of a first set of color clusters and the distribution of the colors, after optional sampling, in the color clusters of this first generated set. The generated color clusters are generally based on color similarities.

Figure 2:
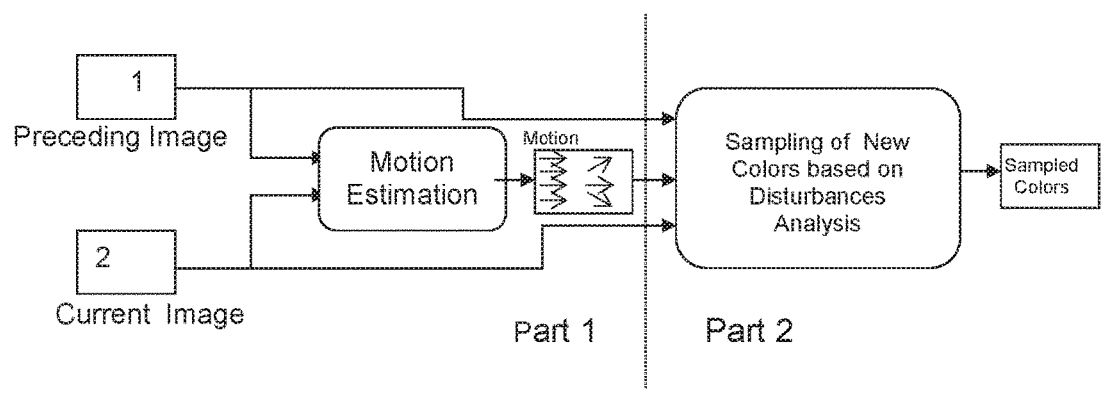
FIG. 2 is a general flowchart of the sampling method according to the invention.

Step 2: determining a map of motion vectors related to a following image, i.e. the second image, in comparison with its preceding image, i.e. the first image. This step is illustrated by part 1 of FIG. 2.

Such a determination is performed in a manner known per se in order to minimize the Displaced Frame Differences ("DFDs") between the preceding and the following given image.

The calculation of the Displaced Frame Differences ("DFDs") can be done according to the following formula: DFD(P, T, V)=I(P,T)−I(P−V, T−1), where I correspond the color of the pixel at position P in the image, T is the time expressed by the time position of the given image, and V is the motion of this pixel between the preceding image and the given image. The color of the pixel is expressed through any usual component value, as for instance, any of the R, G or B values.

The determination of a map of motion vectors related to a given image 1 compared to a following image 2 is an operation generally called "motion estimation". The motion vectors of this map may relate to the whole given image 1 (global motion estimation) or specific parts, such as rectangular blocks, arbitrary shaped patches or even per pixel. In the invention, a "per pixel" approach is preferable. The motion vectors may be represented by a translational model or many other models that can approximate the motion of a real video camera, such as rotation and translation in all three dimensions and zoom.

Applying the motion vectors of this determined map to the given image 1 generates a motion compensated image 1' that can be compared to its following image 2. Each two-dimensional vector of this map, which is assigned to a pixel of this following image (image 2), provides an offset from the coordinates of this pixel in the following image (image 2) to the coordinates of the corresponding pixel in the preceding image (image 1). The motion vectors that are calculated correspond to the motion from image 1 toward image 2. They are defined at temporal position of image 2, for all the pixels of image 2. These motion vectors allow to motion compensate image 1.

Figure 1:
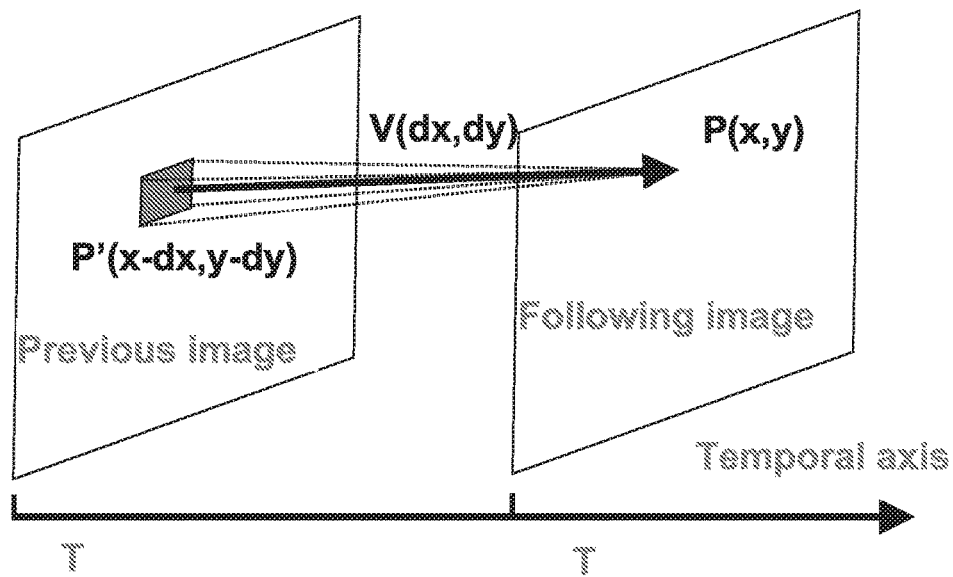
FIG. 1 illustrates the general scheme of motion estimation for each pixel of an image in comparison with the corresponding pixel in a preceding image.

A motion estimation and then, a DFD, could be associated to each pixel of an image. As a first approximation, High DFD value is associated to "occlusion" areas and then, new objects in the video scene are part of these areas That's why it is suggested to ingest only the corresponding pixels where DFDs are high and where motion field is often disturbed (not stable). FIG. 1 illustrates the general scheme of motion estimation for each pixel, and FIG. 3 illustrates an image 2 with the map of motion vectors overlying this image.

Two different embodiments of the following step 3 will now be explained.

Figure 3:
FIG. 3 illustrates an image with its map of motion vectors overlying this image.

Step 3—embodiment 1: based on the determined map of motion vectors as exemplified on FIG. 3, building a pixel mask for this second image according to the following sub-steps:

by applying the motion vector of each pixel of the second image to this pixel, generating a compensated image that motion compensates the first image 1 in reference to the second image 2, calculating, pixel by pixel, the difference between the generated compensated image and the second image, in order to obtain a difference image, comparing each pixel of the calculated difference image to a predetermined threshold, and assigning a zero value to the corresponding pixel of the pixel mask as soon as the pixel of this difference image is below a predetermined threshold or a "one" value to the corresponding pixel of the pixel mask as soon as the pixel of this difference image is equal or above this predetermined threshold. The threshold is generally determined by experimentation and might be, for instance, set to 20% of the maximum video value.

Illustration:

With a video encoded on 8 bits RGB, each pixel component (R, G and B) having a value between 0 and 255, the threshold might be equal to 20% of 255, that is to say 51.

Naming $(R_{1'}, G_{1'}, B_{1'})$ the components of the pixel of the compensated image at the current pixel position, and $(R_2, G_2, B_2)$ the components of the pixel of image 2 at the current pixel position, the pixel of the mask at the current pixel position will have:

a value of 1 if $|R_{1'}-R_2|\geq 51$ and/or $|G_{1'}-G_2|\geq 51$ and/or $|B_{1'}-B_2|\geq 51$;

a value of 0 otherwise.

Optionally, some morphological filtering could be applied additionally to the mask in order to reduce the noise Step 3—embodiment 2: based on the determined map of motion vectors illustrated on FIG. 3, building a pixel mask for this second image as follows: for each pixel of the second image, comparing its motion vector with the motion vectors of neighbor pixels located in the neighborhood of this pixel, and assigning a zero value to the corresponding pixel of the pixel mask as soon as the difference between its motion vector and the motion vectors of neighbor pixels is below a predetermined threshold or a "one" value to the corresponding pixel of the pixel mask as soon as said difference is equal or above said predetermined threshold.

Illustration:

A map of motion vectors is provided at the output of the Motion Estimation module. One motion vector being associated to each pixel of the image, the size of the map of motion vectors is the same as the size of image 1 or image 2

Calculation of the mask: for each motion vector of the motion vector map, a mean distance to the neighborhood vectors is calculated. The neighborhood comprises the motion vectors located in a (n×n) window surrounding the considered motion vector. For instance, n=5.

If c represents the position of the motion vector at a current pixel position, if x represents the position of a motion vector surrounding the motion vector at this current pixel position c, if $V_c$ is the motion vector at the current pixel position c, if $V_{xc}$ and $V_{yc}$ are respectively the horizontal and vertical components of this motion vector $V_c$, if $V_{ij}$ is a motion vector in the neighborhood of $V_c$ (with 0<i≤n and 0<j≤n), if $V_{xi,j}$ and $V_{yi,j}$ are respectively the horizontal and vertical components of this motion vector $V_{ij}$, the mean distance between the motion vector $V_c$ and all his neighbors $V_{ij}$ is calculated according to the formula:

$$D = \frac{\sum_{i,j} \sqrt{(V_{xc} - V_{xi,j})^2 + (V_{yc} - V_{yi,j})^2}}{n^2} \text{ for } i = 1 \text{ to } n \text{ and } j = 1 \text{ to } n.$$

Then, the value of the mask at this pixel position c:
is equal to 1 if D>20% of $\sqrt{V_{xc}^2 + V_{yc}^2}$
is equal to 0 otherwise.

Figure 4:
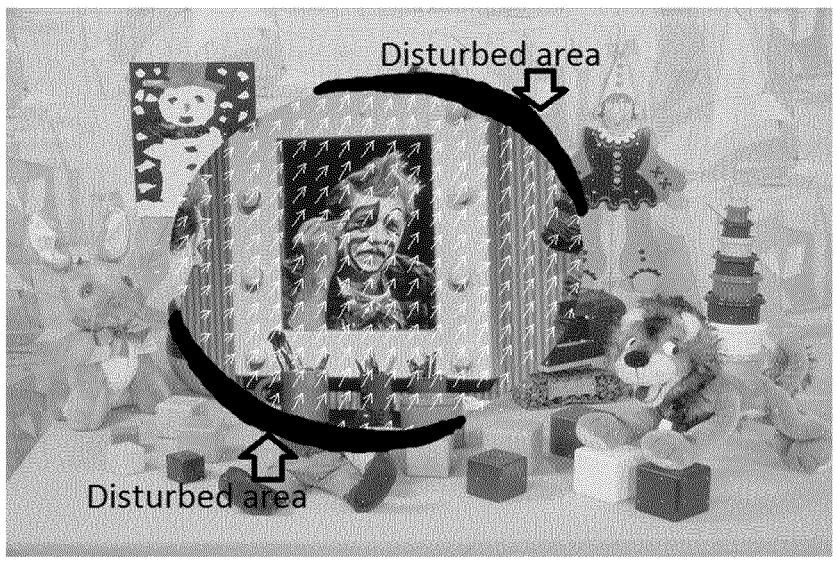
FIG. 4 illustrates, on the image of FIG. 3, the disturbed areas that are identified by applying a pixel mask according to an embodiment of the sampling method of the invention.

Based on the determined map of motion vectors illustrated on FIG. 3, this process allows to identify in the second image areas in which the motion vectors are very different from the other motion vectors all around, i.e. to identify so-called "disturbed areas". FIG. 4 shows such "disturbed areas". For the pixels in these areas, the information at time T (second image) or at T−1 (first image) is not available in order to calculate the DFD. That's why the motion field is so disturbed and the DFDs are high. These areas generally correspond to areas of the second image 2 that were occluded in the previous image 1, i.e. the first image.

At the end of step 3, whatever is the embodiment, a pixel mask is built. This building is based on a map of motion vectors that correspond to the motion from a previous image 1 toward a following image 2.

Step 4: applying the built pixel mask to the second image in order to get a masked image. Due to the specific building process of the pixel mask, the effect of its application is to select the areas—and then the corresponding pixels—of the second image that are perturbed in comparison to the preceding image, i.e. the first image. The result of this application of the pixel mask is a specific sampling of the pixels of the following image, i.e. second image.

Figure 5:
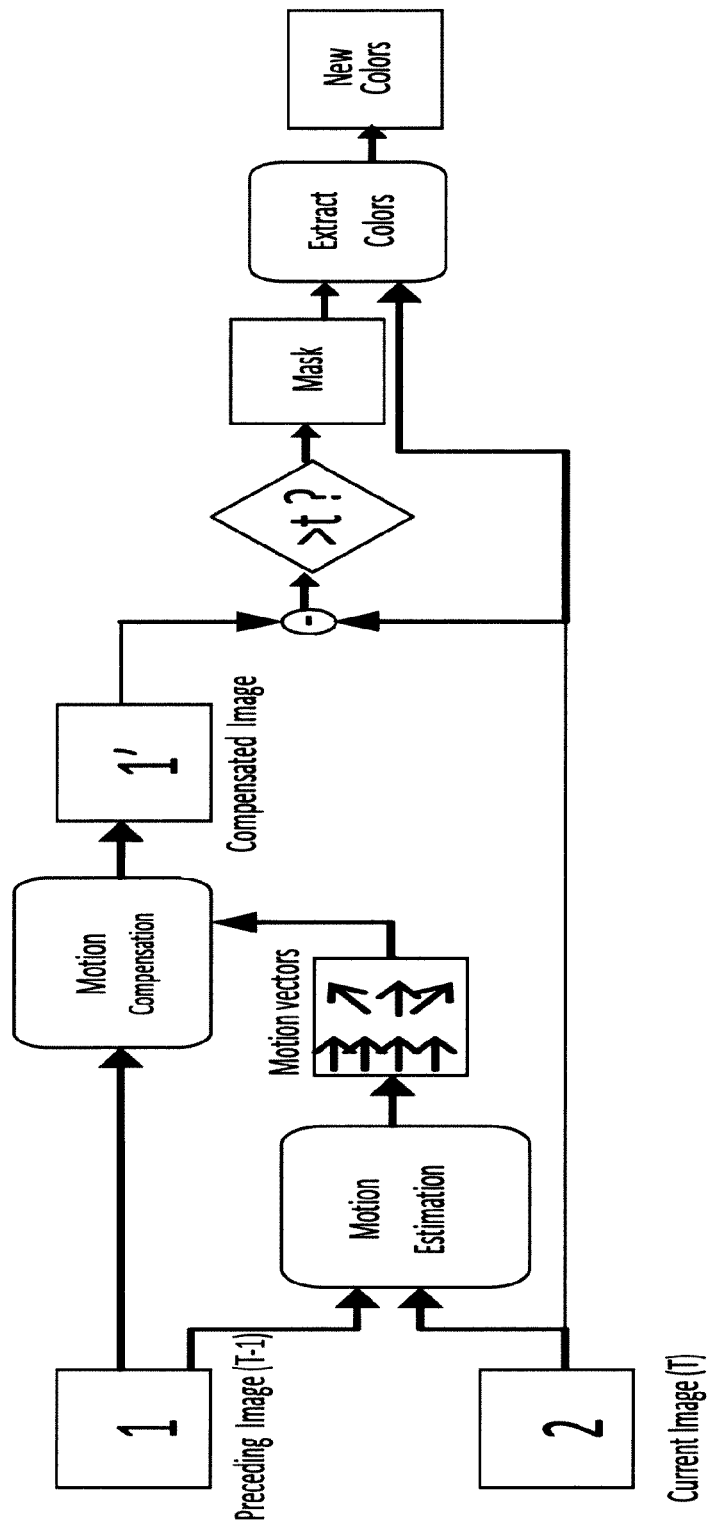
FIG. 5 is a detailed flowchart of the sampling method according to a first embodiment of the invention.

FIG. 5 illustrates such a sampling when step 3 is performed according to the first embodiment. According to this sampling process which goes through the calculation of a difference image, whenever the difference for a pixel is higher than the threshold, the corresponding pixel position is declared as perturbed, and such a pixel is considered to be part of an area of new image information that should be considered, in the following step, for clustering.

Figure 6:
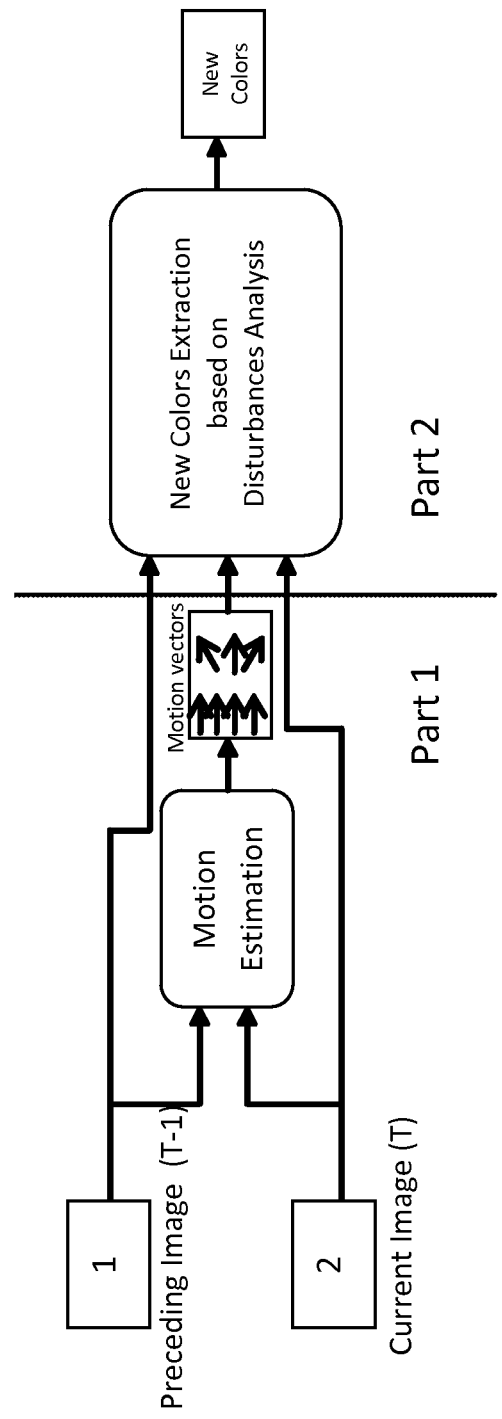
FIG. 6 is a detailed flowchart of the sampling method according to a second embodiment the invention.

FIG. 6 illustrates such a sampling when step 3 is performed according to the second embodiment. According to this sampling process, the motion vectors of the second or current image are considered by themselves. At each pixel position of the second or current image, the corresponding motion vector is compared to the motion vectors of the neighborhood. Whenever the distortion of the motion vectors field at this pixel position is higher than a fixed threshold, the pixel is considered to be part of an area of new image information that should be considered for clustering in the following step.

In FIGS. 5 and 6, reference 1 concerns the first or previous image and reference 2 concerns the second, current or following image.

Step 5: using preferably the same clustering method as for step 1 above, clustering the colors already clustered together with the colors of the obtained masked image. Here, the colors already clustered are the colors of the first image, optionally after sampling. Before applying this clustering method, a further sampling of the colors of the masked image may be performed. As a result of step 5, an update the set of color clusters is obtained with the distribution of already clustered colors and newly clustered colors in the color clusters of this updated set.

Thank to the specific sampling of colors of the second image 2 according to the invention, only the colors at the output of the pixel mask of the second image are ingested as far as this second image is concerned, instead of ingesting all the colors of this second image, therefore saving computing resources.

Steps 2 to 5 are then repeated for each of the other successive images of the video sequence, where the second image is replaced by a current image and the first image is replaced by the image preceding this current image. The current image is called following image in reference to its preceding image. According to the method according to the invention, each time a masked image is obtained, a step of clustering the colors already clustered together with the colors of this masked image is performed, in order to update the set of color clusters and to distribute these colors in color clusters of the updated set.

At the end of the process, i.e. when the last image is reached, a color clustering of all images of the video sequence is obtained.

It is to be understood that the invention may be implemented in various forms of hardware, software, firmware, special purpose processors, or combinations thereof. The invention may be notably implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

Notably, the invention as described above is implemented by a color clustering device comprising:
    a color sampler for sampling colors of images of the video sequence into colors of corresponding masked images,
    a color cluster generator configured to generate a set of colors clusters from the masked images provided by the color sampler;
    a color distributor configured to distribute the colors of the masked images into the color clusters generated by the color cluster generator.

The color sampler notably comprises:
    a pixel map builder for building a pixel mask, successively for each image 2 following a preceding image 1 of the video sequence,
    a masked image builder configured to apply a pixel mask build by a pixel map builder to this following image 2, in order to obtain a corresponding masked image that samples the pixels of this following image 2.

As a first variant, the pixel mask builder comprises:
    a motion vector map builder configured to build a map of motion vectors that correspond to the motion from a preceding image 1 toward its following image 2 in the video sequence,
    an image generator configured to generate a compensated image 1' that motion compensates the preceding image 1 in reference to its following image 2 by applying the map of motion vectors built by the motion vector map builder.

This pixel mask builder is configured to build a pixel mask from the difference, pixel by pixel, between the compensated image 1' and the preceding image 1.

As a second variant, the pixel mask builder comprises a motion vector map builder configured to build a map of motion vectors that correspond to the motion from a preceding image 1 toward its following image 2 in the video sequence, and is configured to build a pixel mask for the following image 2 from the difference between the motion vector corresponding to each pixel of said preceding image and the motion vectors corresponding to neighbor pixels located in the neighborhood of said pixel.

While the present invention is described with respect to particular examples and preferred embodiments, it is understood that the present invention is not limited to these examples and embodiments. The present invention as claimed therefore includes variations from the particular examples and preferred embodiments described herein, as will be apparent to one of skill in the art. While some of the specific embodiments may be described and claimed separately, it is understood that the various features of embodiments described and claimed herein may be used in combination. Reference numerals appearing in the claims are by way of illustration only and shall have no limiting effect on the scope of the claims.

The invention claimed is:

1. A method of clustering colors of images of a video sequence, comprising:
    clustering colors of a first image of the video sequence to generate a set of color clusters and to distribute said colors in color clusters of said generated set, and,
    successively for each image following a preceding image of this sequence,
        building a pixel mask that samples pixels of said following image that are associated with a color difference above a threshold, wherein said color difference is computed for each pixel of this pixel mask between a color value of the same pixel in said following image and a color value of the same pixel in a compensated image generated by applying a map of motion vectors to said preceding image, wherein said map of motion vectors corresponds to a motion from said preceding image toward said following image,
        applying said pixel mask to said following image in order to obtain a masked image, and
        distributing colors of said masked image in color clusters of said generated set, resulting in an updated of the distribution of colors in said color clusters.

2. A color clustering device for clustering colors of images of a video sequence comprising a central processing unit having a processor and a memory, the processor and memory being configured to perform as:
    an initial color clustering module that clusters colors of a first image of the video sequence to generate a set of color clusters and to distribute said colors in color clusters of said generated set,
    a pixel map builder that builds a pixel mask that samples pixels of an image of said sequence following a preceding image that are associated with a color difference above a threshold, wherein said color difference is computed for each pixel of said pixel mask between a color value of the same pixel in said following image and a color value of the same pixel in a compensated image generated by applying a map of motion vectors to said preceding image, said map of motion vectors corresponding to the motion from said preceding image toward said following image, and
    an updating color clustering that applies the pixel mask built by said pixel map builder to said following image in order to obtain a masked image, and that distributes the colors of said masked image in color clusters of said generated set, resulting in an updated of the distribution of colors in said color clusters.

3. A method of clustering colors of images of a video sequence, comprising:
    clustering colors of a first image of the video sequence to generate a set of color clusters and to distribute said colors in color clusters of said generated set, and,
    successively for each image following a preceding image of this sequence,
        building a pixel mask that samples pixels of said following image that are associated with a motion difference above a threshold, wherein said motion vector difference is computed for each pixel of this pixel mask, between a motion vector of the same pixel in said following image computed with reference to a corresponding pixel in said preceding image and motion vectors of neighboring pixels located in the neighborhood of said pixel computed in reference to their corresponding pixels in said preceding image,
        applying said pixel mask to said following image in order to obtain a masked image, and
        distributing colors of said masked image in color clusters of said generated set, resulting in an updated of the distribution of colors in said color clusters.

4. A color clustering device for clustering colors of images of a video sequence comprising:

a central processing unit having a processor and an associated memory, the processor and memory being configured to perform as:

an initial color clustering module that clusters colors of a first image of the video sequence to generate a set of color clusters and to distribute said colors in color clusters of said generated set, a pixel map builder that builds a pixel mask that samples pixels of an image of said sequence following a preceding image that are associated with a motion difference above a threshold, wherein said motion vector difference is computed for each pixel of this pixel mask, between a motion vector of the same pixel in said following image computed in reference to a corresponding pixel in said preceding image and motion vectors of neighboring pixels located in the neighborhood of said pixel computed in reference to their corresponding pixels in said preceding image, and an updating color clustering that applies the pixel mask built by said pixel map builder to said following image in order to obtain a masked image, and that distributes the colors of said masked image in color clusters of said generated set, resulting in an update of the distribution of colors in said color clusters.

* * * * *